(12) United States Patent
Whynott (10) Patent No.: US 7,438,457 B2
(45) Date of Patent: Oct. 21, 2008

(54) INPUT SHAFT FOR A LAMP ADJUSTER

(75) Inventor: John Whynott, Kenosha, WI (US)

(73) Assignee: Asyst Technologies, LLC, Kenosha, WI (US)

( * ) Notice: Subject to any disclaimer, the term of this patent is extended or adjusted under 35 U.S.C. 154(b) by 76 days.

(21) Appl. No.: 11/273,720

(22) Filed: Nov. 14, 2005

(65) Prior Publication Data

US 2007/0109805 A1 May 17, 2007

(51) Int. Cl.
F21V 19/02 (2006.01)
(52) U.S. Cl. .................. 362/524; 362/525; 74/89.45
(58) Field of Classification Search .................. None
See application file for complete search history.

(56) References Cited

U.S. PATENT DOCUMENTS

| 4,893,219 | A | * | 1/1990 | Lisak | 362/524 |
| 5,079,676 | A | * | 1/1992 | Lisak | 362/524 |
| 5,150,851 | A | * | 9/1992 | Manusch et al. | 242/599.4 |
| 5,580,314 | A | * | 12/1996 | Moriyama et al. | 464/162 |
| 5,897,202 | A | * | 4/1999 | Denley | 362/463 |
| 6,017,136 | A | * | 1/2000 | Burton | 362/273 |
| 6,257,747 | B1 | * | 7/2001 | Burton | 362/524 |
| 6,443,607 | B1 | * | 9/2002 | Cassidy | 362/515 |
| 6,474,850 | B1 | * | 11/2002 | Burton | 362/460 |
| 6,773,153 | B2 | * | 8/2004 | Burton | 362/528 |
| 6,913,374 | B2 | * | 7/2005 | Burton | 362/460 |
| 6,918,691 | B2 | * | 7/2005 | Gattone et al. | 362/515 |
| 6,979,109 | B2 | * | 12/2005 | Burton | 362/460 |
| 7,004,607 | B2 | * | 2/2006 | Aguinaga | 362/528 |
| 7,066,632 | B2 | * | 6/2006 | Burton | 362/524 |
| 7,118,259 | B2 | * | 10/2006 | Fladhammer | 362/515 |
| 7,198,392 | B2 | * | 4/2007 | Hobbs et al. | 362/460 |
| 7,284,887 | B2 | * | 10/2007 | Fladhammer | 362/515 |
| 2003/0043591 | A1 | * | 3/2003 | Burton | 362/528 |
| 2005/0231967 | A1 | * | 10/2005 | Hobbs et al. | 362/460 |

* cited by examiner

Primary Examiner—Sandra O'Shea
Assistant Examiner—Danielle Dunn
(74) Attorney, Agent, or Firm—Brian G. Gilpin; Jennifer R. Racine; Godfrey & Kahn, S.C.

(57) ABSTRACT

An input shaft for a lamp adjuster is disclosed. The input shaft includes a top portion and bottom portion. The top portion and bottom portion can move axially relative to one another such that the input shaft can have a plurality of different lengths. The input shaft can also include a clutching feature. An adjuster and lamp assembly including an input shaft according to the present invention are also disclosed.

17 Claims, 12 Drawing Sheets

INPUT SHAFT FOR A LAMP ADJUSTER

BACKGROUND OF THE INVENTION

The present invention relates generally to adjusters that are used to adjust the aim of a vehicle lamp. Specifically, this invention relates to an input shaft for a vehicle lamp adjuster that can be adjusted to multiple lengths and can include a clutching mechanism.

Vehicles such as automobiles typically have several lamps including head lamps and fog lamps. These lamps typically include a reflector and a lens with a bulb mounted therebetween, and are typically securely fit into mounting brackets attached to the vehicle. Together, a lamp and a mounting bracket form a complete lamp assembly. Once the lamp assembly has been manufactured and installed into a vehicle, the lamp must be adjusted to the proper aim. As a result of accidents, maintenance, and normal vibrations and wear, the aim of the lamp must be occasionally adjusted during the lifetime of the vehicle as well.

One method of adjusting the aim of the lamp involves using an adjuster. The adjuster may be formed as part of the mounting bracket or may be a separate part that communicates with both the lamp and the mounting bracket. One known type of adjuster comprises a housing and an output shaft extending therefrom. The output shaft is engaged to the lamp. Actuation or operation of the adjuster causes the output shaft to move with respect to the lamp assembly. Such movement causes the lamp to pivot or otherwise move with respect to the mounting bracket, thereby adjusting the aim of the lamp.

One example of this type of adjuster, disclosed in U.S. Pat. No. 6,257,747 to Burton, requires manual operation. The housing of the adjuster has an opening and a gear positioned inside the housing. The gear is functionally engaged to the output shaft. An input shaft is inserted into the opening and interacts with the gear. Actuation of the input shaft results in rotation of the gear and engaged output shaft. The gear translates actuation of the input shaft into movement of the output shaft. Numerous variations and improvements exist on this concept.

Due to the range of lamp assemblies and vehicles, a wide range of input shafts for lamp assemblies are currently used. For example, the design of a particular vehicle may require lamp assemblies that have very long input shafts, very short input shafts, and any length in between. The variety of vehicle designs, and consequently input shaft lengths, makes it difficult for manufacturers to sell a single adjuster configuration for multiple applications. Instead, an adjuster must be developed for each application, which is inefficient and more expensive for the adjuster manufacturers. As well, current input shafts are typically manufactured as a single piece from a metal material such as zinc. The metal input shafts are expensive to manufacture, and the single piece design does not allow the input shaft to include any clutching mechanism to prevent damage to the adjuster when excessive torque is applied to the input shaft.

Accordingly, a need exists for an improved lamp adjuster that solves these and other deficiencies in the prior art. Of course, the present invention may be used in a multitude of situations where similar performance capabilities are required.

SUMMARY OF THE INVENTION

The present invention provides an input shaft for a lamp adjuster that is cost-effective, provides improved functionality, and eliminates certain of the deficiencies inherent in existing designs.

The input shaft of the present invention includes a top portion having an interior, and a bottom portion having a body disposed at least partially within the interior of the top portion and supporting a gear. The top portion and bottom portion matingly engage so that rotation of the top portion causes the bottom portion to rotate in concert with the top portion. The input shaft can also include clutching slots in the top portion to prevent damage to the adjuster and lamp assembly from the application of excessive torque. The top portion can move relative to the bottom portion such that the input shaft adjusts to a plurality of different lengths for use in a variety of different applications. The clutching feature could also be incorporated in a fixed-length input shaft design.

An adjuster and a lamp assembly are also contemplated by the present invention. The adjuster includes a housing, an output shaft disposed partially within the housing and engaging the lamp assembly, and an input shaft disposed partially within the housing. The input shaft includes a top portion with at least one clutching slot and a bottom portion disposed at least partially within the top portion and supporting a gear. The top portion can move axially relative to the bottom portion such that the input shaft adjusts to a plurality of different lengths, and rotation of the input shaft effects movement of the output shaft to adjust the lamp assembly. The lamp assembly includes a mounting bracket, a lamp positioned on the mounting bracket, and an adjuster having an input shaft according to the present invention.

The input shaft, adjuster and lamp assembly of the present invention have many advantages over existing devices. In particular, one embodiment of the input shaft can include a clutching mechanism, which prevents damage to the adjuster when excessive torque is applied to the input shaft and thus prolongs the life of the adjuster. The input shaft can also be adjusted to multiple lengths in one embodiment, which allows a single input shaft and a single adjuster to be used in a variety of applications. The use of a single design for the input shaft is more efficient and cost effective for adjuster manufacturers, and allows the input shaft to be sold separately as one component of the adjuster or together with the adjuster as a modular unit. These and other objects and advantages of the present invention will become apparent from the detailed description, claims, and accompanying drawings.

While one possible application of the present invention is in connection with a vehicle lamp, many other applications are possible and references to use in connection with a vehicle lamp should not be deemed to limit the uses of the present invention. The terms "lamp," "mounting bracket," "lamp assembly," "output shaft," "input shaft," or "housing" as used herein should not be interpreted as being limited to specific forms, shapes, or compositions. Rather, the parts may have a wide variety of shapes and forms and may be composed of a wide variety of materials.

DETAILED DESCRIPTION OF THE PREFERRED EMBODIMENTS

Referring now to the drawings, FIGS. 1-6 show an input shaft for an adjuster according to one embodiment of the present invention. The input shaft 10 of the present invention includes a top portion 12 and a bottom portion 14.

Figure 1:
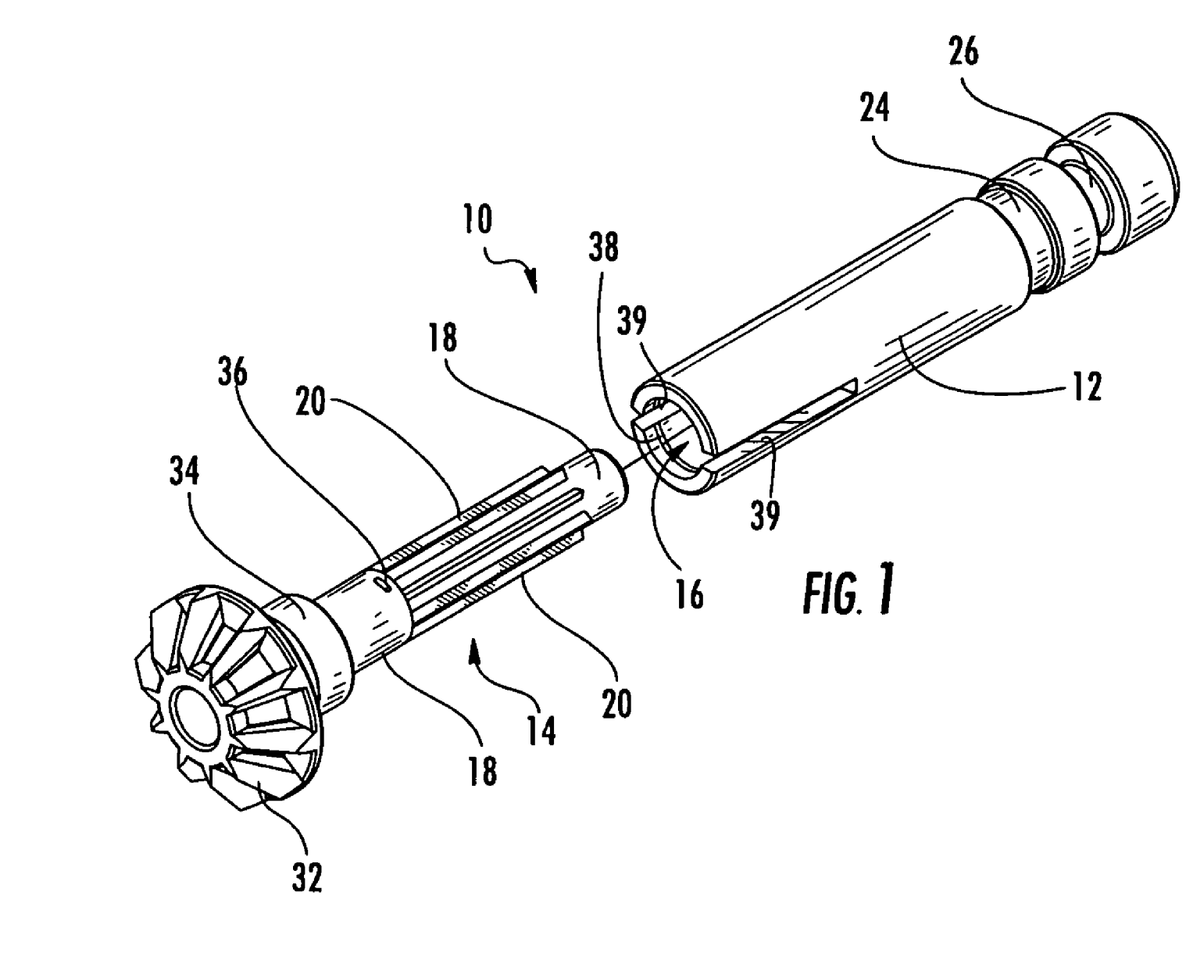
FIG. 1 is an exploded perspective view of an input shaft for an adjuster in accordance with one embodiment of the present invention.
Figure 2:
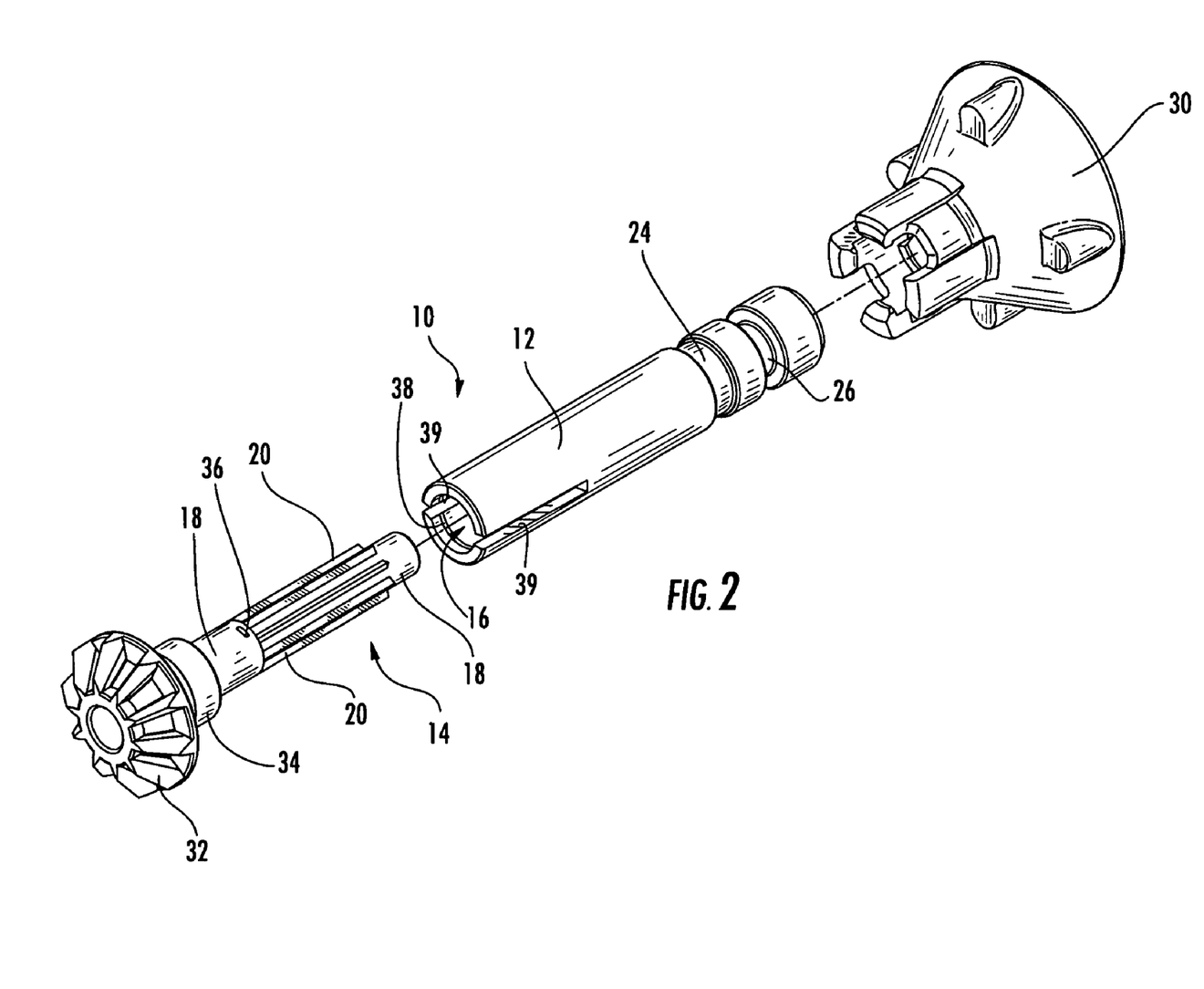
FIG. 2 is an exploded perspective view of the input shaft of FIG. 1, illustrating the use of a funnel locator accessory.
Figure 9A:
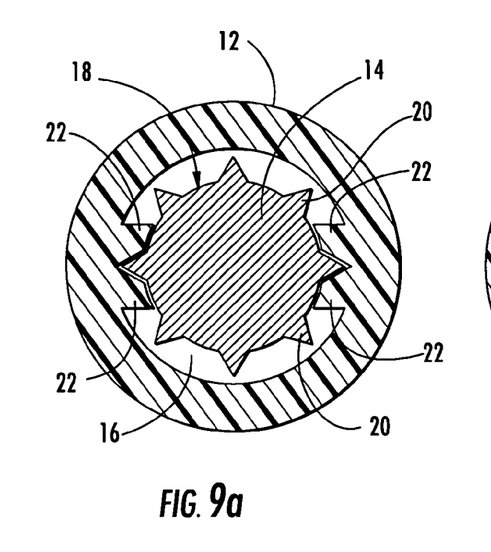
FIG. 9a is a cross sectional view of the input shaft of FIG. 3 taken along the plane 9-9 in FIG. 3, showing one embodiment of the engagement between the top portion and the bottom portion of the input shaft.
Figure 9B:
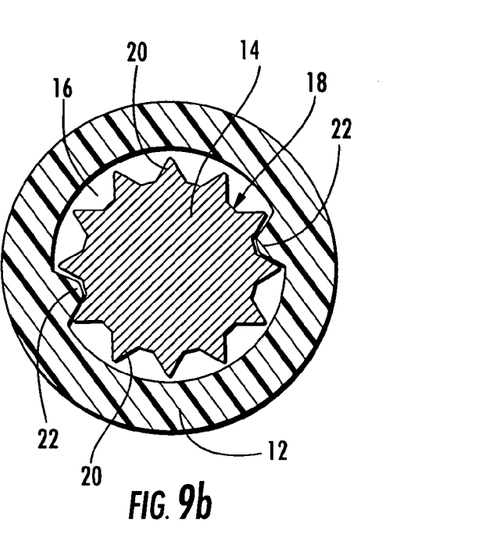
FIG. 9b is a cross sectional view of the input shaft of FIG. 3 taken along the plane 9-9 in FIG. 3, showing another embodiment of the engagement between the top portion and the bottom portion of the input shaft.
Figure 10A:
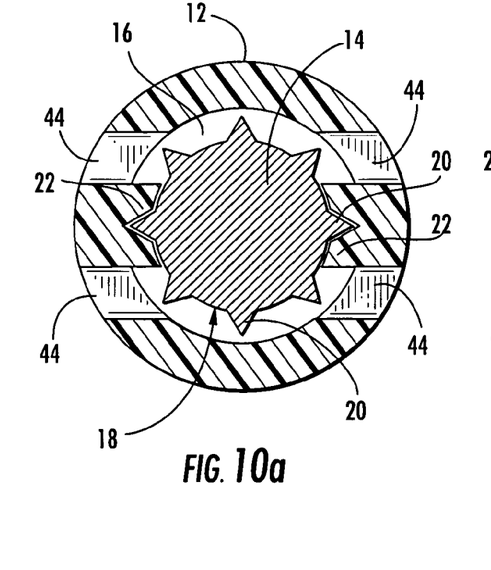
FIG. 10a is a cross sectional view of the input shaft of FIG. 12a taken along the plane 10-10 in FIG. 12a, showing one embodiment of the engagement between the top portion and the bottom portion of the input shaft.
Figure 10B:
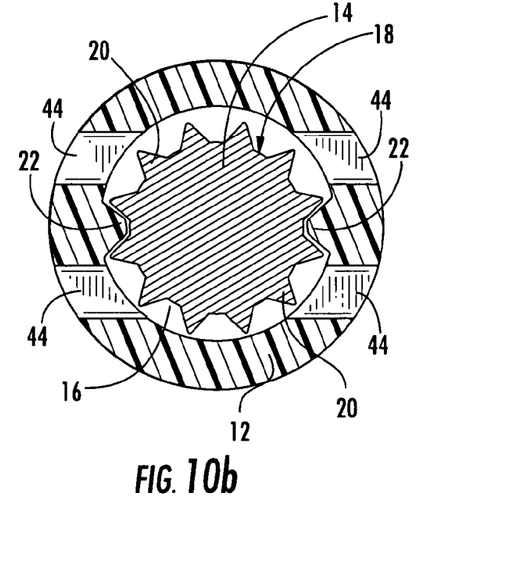
FIG. 10b is a cross sectional view of the input shaft of FIG. 12a taken along the plane 10-10 in FIG. 12a, showing another embodiment of the engagement between the between the top portion and the bottom portion of the input shaft.

The top portion 12 is a generally cylindrical shaft with an open interior 16, and the bottom portion 14 has a generally cylindrical body 18 that fits into the open interior 16 of the top portion 12. The body 18 of the bottom portion 14 and the open interior 16 of the top portion 12 are preferably formed to matingly engage. One way in which the body 18 and interior 16 can matingly engage is through the use of mating splines. FIGS. 1 and 2 show exterior splines 20 on the body 18 of the bottom portion 14 that mate with interior splines 22 formed on the interior 16 of the top portion 12 (shown most clearly in FIGS. 9a/b, 10a/b and 11). The mating splines 20, 22 can have a number of different configurations. For example, FIGS. 9a and 10a show one possible configuration for the interior splines 22 wherein the interior splines 22 receive the exterior splines 20 and FIGS. 9b and 10b show another possible configuration for the interior splines 22 wherein the exterior splines 20 receive the interior splines 22. Any number of mating splines 20, 22 could be used. Other methods of mating engagement could be employed as well, including but not limited to threaded engagement.

The top portion 12 may also include any number of grooves to accommodate accessories, mounting hardware and the like. FIGS. 1-6, for example, show a first groove 24 to accommodate a mounting bracket 28 and a second groove 26 to accommodate a locator accessory 30 as seen best in FIGS. 5 and 6. The locator accessory 30 can be used to help an operator locate the input shaft once the lamp assembly has been installed in a vehicle, and could be of a number of different shapes and sizes including but not limited to the funnel shape shown. Any number of grooves may be used, however, no grooves are required for the present invention.

Top portion 12 also includes at least one annular ring 38 that snap fits into notch 36 on the bottom portion 14 to fasten the top portion 12 to the bottom portion 14. Any number of annular rings can be used, including a single annular ring 38 for applications that do not require a multiple-length input shaft. Multiple annular rings 38 would be used for applications requiring a multiple-length input shaft, as described in more detail below. Tooling slots 39 can be used in connection with annular rings 38 to facilitate removal of the top portion 12 including the annular rings 38 from the molding tool; however, tooling slots 39 are not particular to the present invention and a number of other means could also be used to manufacture or facilitate manufacture of the annular rings 38.

Figure 5:
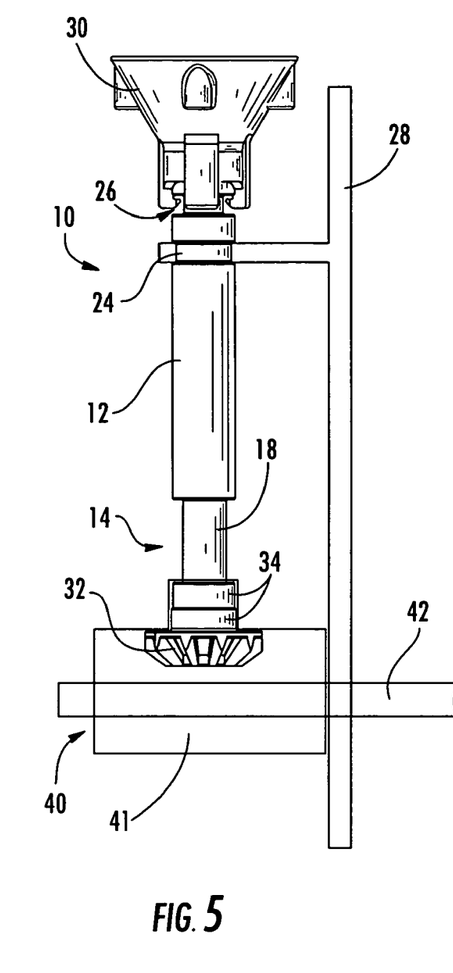
FIG. 5 is a side view of the adjuster of FIG. 2, shown installed in a portion of a lamp assembly in an extended position.
Figure 6:
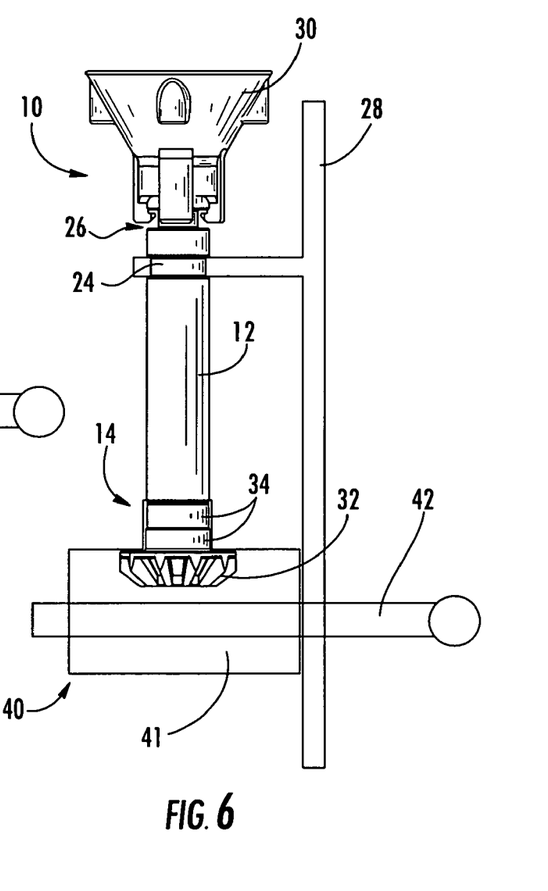
FIG. 6 is a side view of the adjuster of FIG. 2, shown installed in a portion of a lamp assembly in a non-extended position.

The bottom portion 14 includes a gear 32, such as a bevel gear 32 as shown, that will engage the adjusting mechanism, such as an adjustment gear (not shown) in an adjuster 40 to actuate the output shaft 42 as shown in FIGS. 5 and 6. The gear 32 can be of any configuration necessary for a particular adjuster, and could be integrally formed on the bottom portion or otherwise attached thereto. The bottom portion 14 can further include a base 34 in between the body 18 and the gear 32; however, the body 18 and gear 32 could be formed without base 34. The base 34 is preferably of the same diameter as the top portion 12.

The bottom portion 14 also includes a notch 36 that snap fits into annular ring(s) 38 formed in the interior 16 of the top portion 12 to keep the top portion 12 and bottom portion 14 of the input shaft 10 secured together. Notch 36 can have a variety of shapes, including but not limited to the rectangular shape shown in FIG. 1 and the annular shape shown in FIG. 11. The bottom portion 14 could also include any number of grooves to accommodate accessories, mounting hardware and the like; however, no grooves are required.

Figure 3:
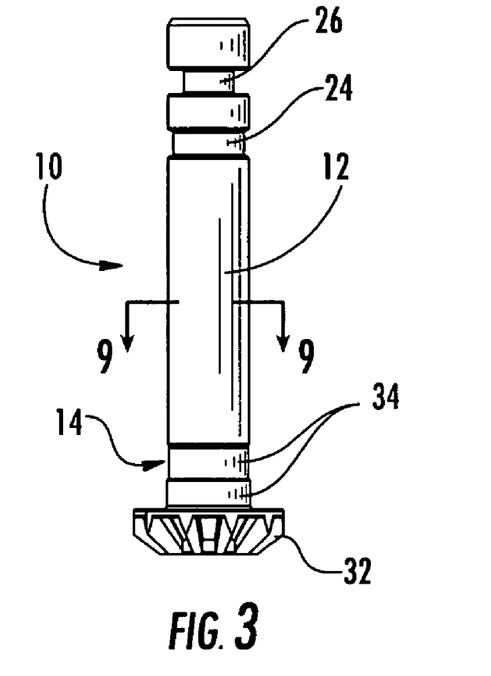
FIG. 3 is a side view of the adjuster of FIG. 1, shown in a non-extended position.
Figure 4:
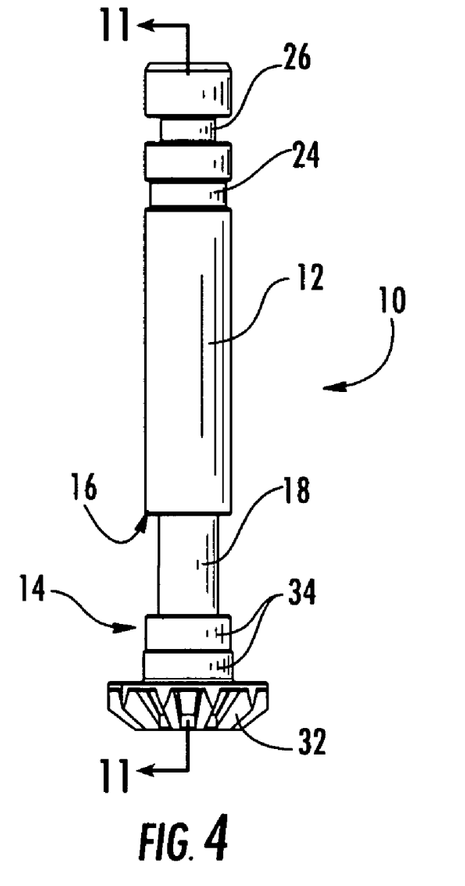
FIG. 4 is a side view of the adjuster of FIG. 1, shown in a partially extended position.

The input shaft 10 of the present invention allows a single input shaft 10 to be used for a variety of applications requiring input shafts of varying lengths, as shown best in FIGS. 3-6, 8 and 16. FIGS. 3 and 4 illustrate the variable length feature of the input shaft 10 independent of an adjuster or lamp assembly. The input shaft 10 in FIG. 3 is shown in the non-extended position, wherein the top portion 12 is in contact with the base 34 of the bottom portion 14. As previously mentioned, the base 34 is not necessary, and thus the top portion 12 could be in contact with the gear 32 or any other end piece of the bottom portion when the input shaft 10 is in the non-extended position. FIG. 4 shows the input shaft 10 in an extended position, wherein the top portion 12 is not in contact with the gear 32 or base 34 of the bottom portion and at least a portion of the body 18 of the bottom portion 14 is exposed. A number of extended positions are possible, including a single extended position and a plurality of extended positions. In addition, the input shaft 10 of the present invention could be used in applications where multiple lengths are not required, but the clutching feature described below is required. In such applications, the input shaft 10 would only need to snap fit in one position, which could be a non-extended position. The input shaft 10 of the present invention could of course also incorporate both the multiple-length feature and the clutching feature.

FIGS. 5 and 6 illustrate the use of an input shaft 10 of the present invention in two different applications requiring input shafts of different lengths. Namely, FIGS. 5 and 6 show an input shaft 10 installed in an adjuster 40 having a housing 41 and an output shaft 42. The adjuster housing 41 and input shaft 10 engage a mounting bracket 28. The configuration of the mounting brackets 28 in each of FIGS. 5 and 6 requires a different length of input shaft, which the input shaft 10 of the present invention is able to accommodate. The mounting bracket 28 of FIG. 5 for example requires a longer input shaft 10 than the mounting bracket 28 of FIG. 6. Thus, the input shaft 10 of FIG. 5 is shown in an extended position in which the body 18 is exposed, while the input shaft 10 of FIG. 6 is shown in a non-extended position in which the top portion 12 is in contact with the base 34 of the bottom portion. Again, a plurality of different extended positions could be used depending on the particular configuration required by a particular vehicle, adjuster, or mounting bracket.

Figure 7:
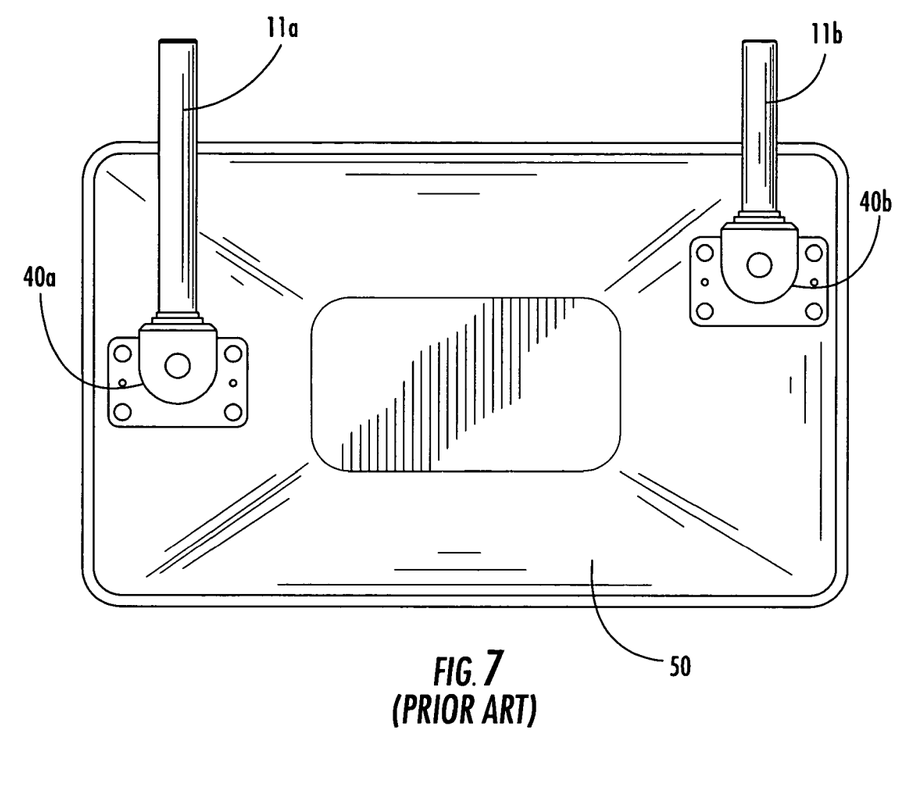
FIG. 7 is a rear view of a headlamp having two prior art adjusters installed therein, the two prior art adjusters using fixed-length prior art input shafts of different lengths.
Figure 8:
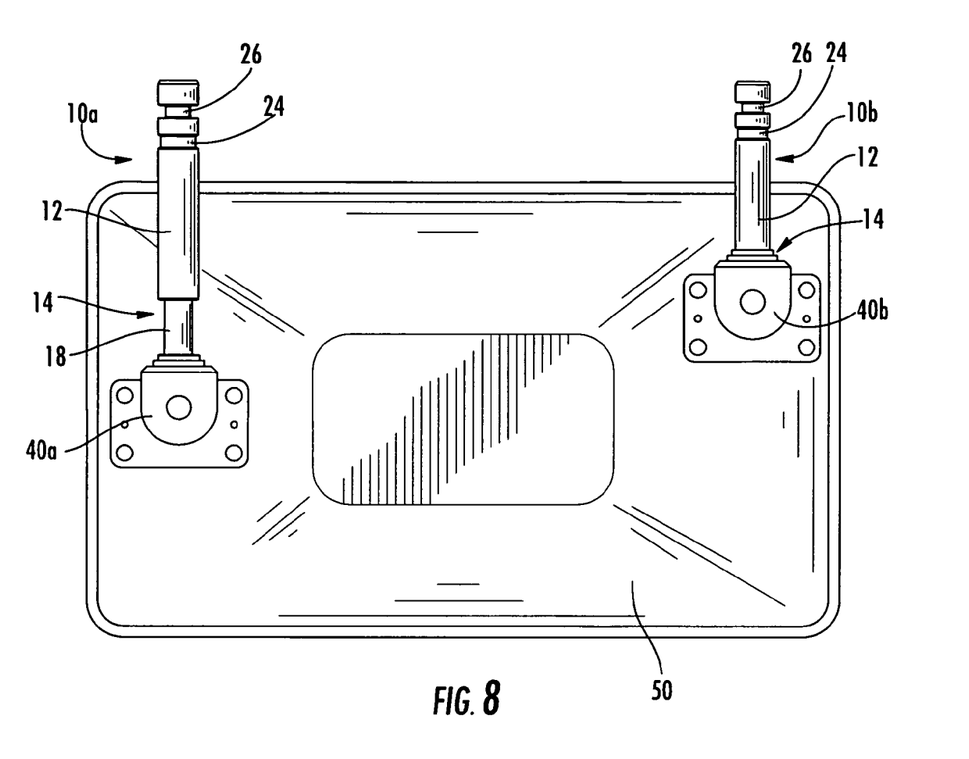
FIG. 8 is a rear view of a headlamp having two adjusters according to one embodiment of the present invention, showing the use of multiple length input shafts according to the present invention.
Figure 15:
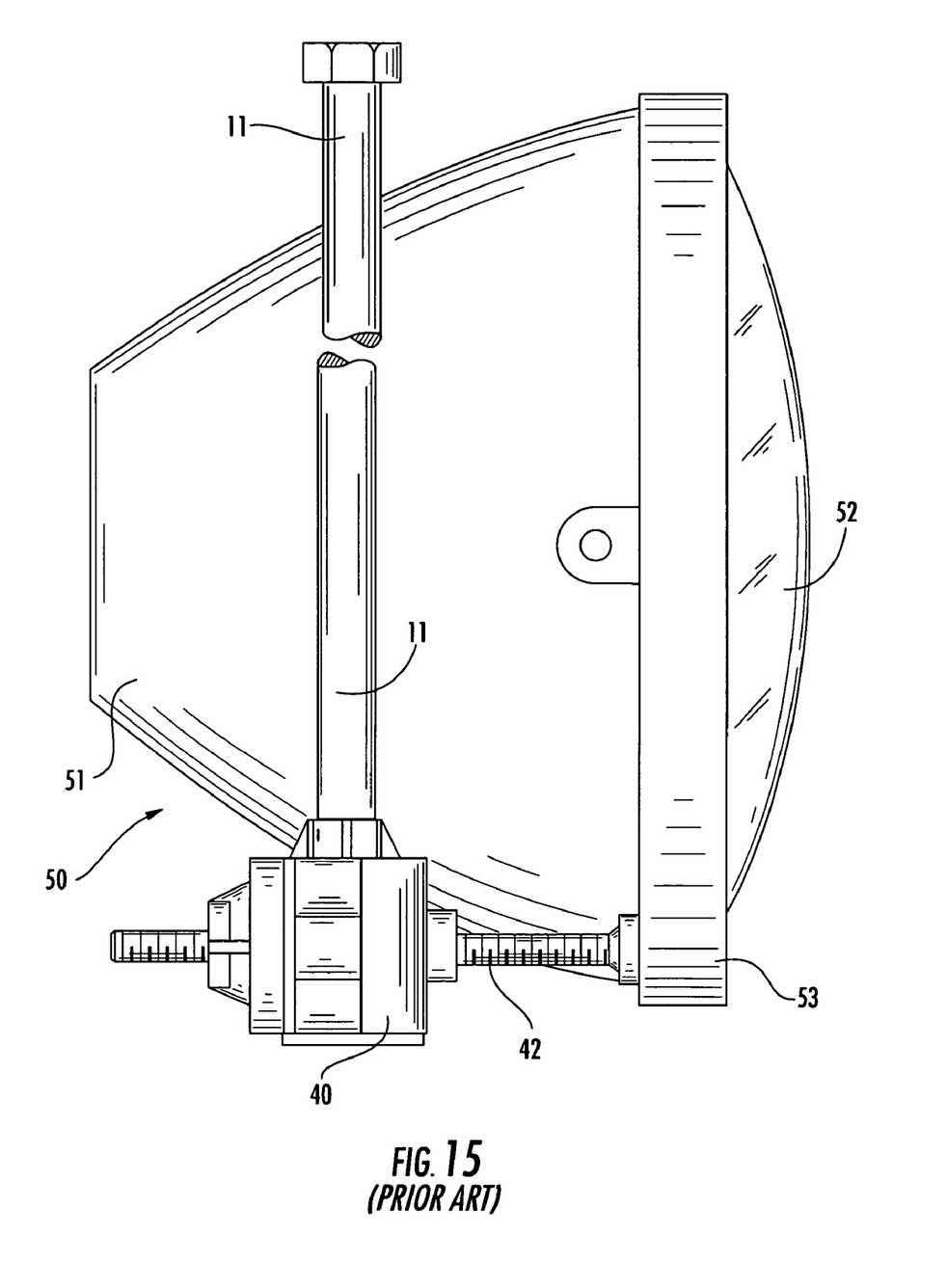
FIG. 15 is a side view of a prior art lamp assembly illustrating the use of an adjuster having a prior art fixed-length input shaft.
Figure 16:
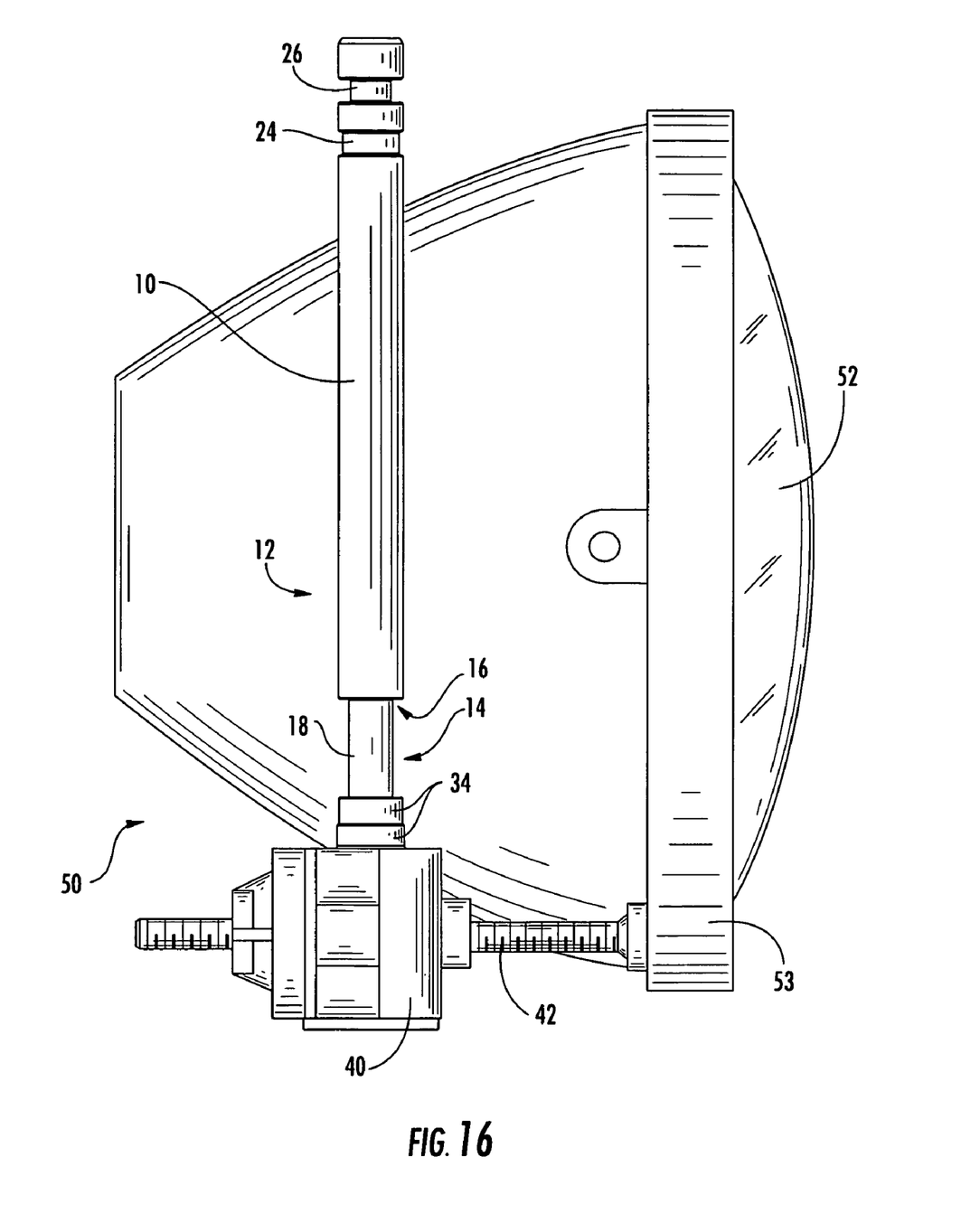
FIG. 16 is a side view of a lamp assembly according to one embodiment of the present invention, illustrating the use of an input shaft according to the present invention in an extended position.

FIGS. 8 and 16 show the input shaft 10 of the present invention installed in adjusters on lamp assemblies. In FIG. 8, a rear view of a lamp assembly 50 is shown with two installed adjusters 40a, 40b. The adjusters 40a, 40b must be installed at different locations on the lamp assembly 50 in order to facilitate each adjuster's purpose. For example, adjuster 40a may be used to pivot the lamp assembly 50 right and left, while the adjuster 40b may be used to pivot the lamp assembly 50 up and down. Thus, adjuster 40a should be located in the middle on the vertical length of the lamp assembly 50, while the adjuster 40b should be located near either the top or bottom of the vertical length of the lamp assembly 50. As a result, the adjusters 40a, 40b require input shafts 10 of different lengths. In the prior art, shown in FIG. 7, two separate fixed input shafts 11a, 11b would have had to be manufactured to meet the needs of both adjusters 40a, 40b, respectively. Instead, FIG. 8 shows that an input shaft 10 of the present invention can be used in connection with each adjuster 40a, 40b. The input shaft 10a used with adjuster 40a is in an extended position, wherein the body 18 of the bottom portion 14 is exposed, while the input shaft 10b used with adjuster 40b is in the non-extended position. Thus, the adjuster manufacturers can make a single input shaft for use with both adjusters. Similarly, FIG. 16 shows a side view of a lamp assembly 50 including a reflector 51, a lens 52 and a mounting bracket 53 with an adjuster 40 installed thereon and including an input shaft 10 of the present invention. The input shaft 10 is in an extended position, wherein the body 18 of the bottom portion 14 is exposed. The input shaft 10 of the present invention can accommodate varying length requirements, whereas the prior art input shaft 11 shown in FIG. 15 must be custom fabricated for each application requiring a different length.

Figure 11:
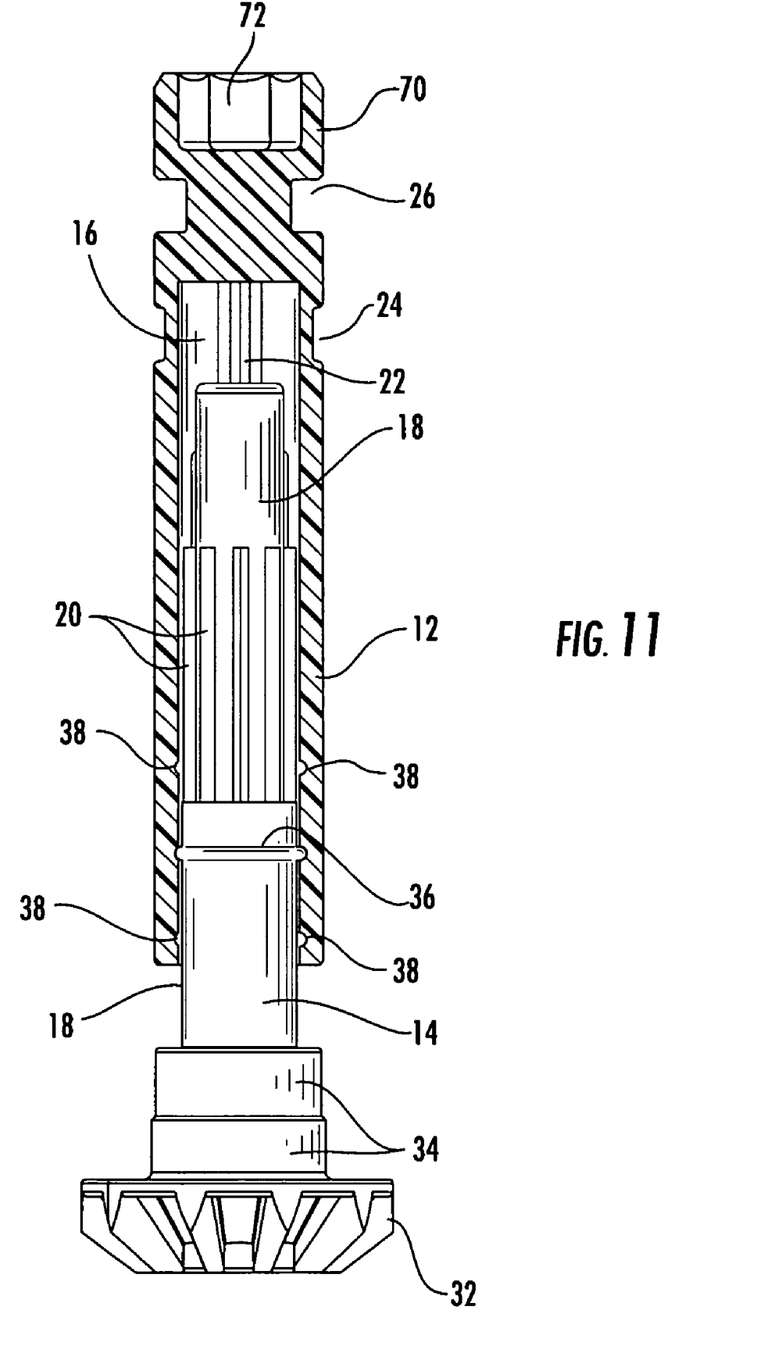
FIG. 11 is a partial cross sectional view of the input shaft of FIG. 4 taken along the plane 11-11 in FIG. 4.
Figures 12, 12A:
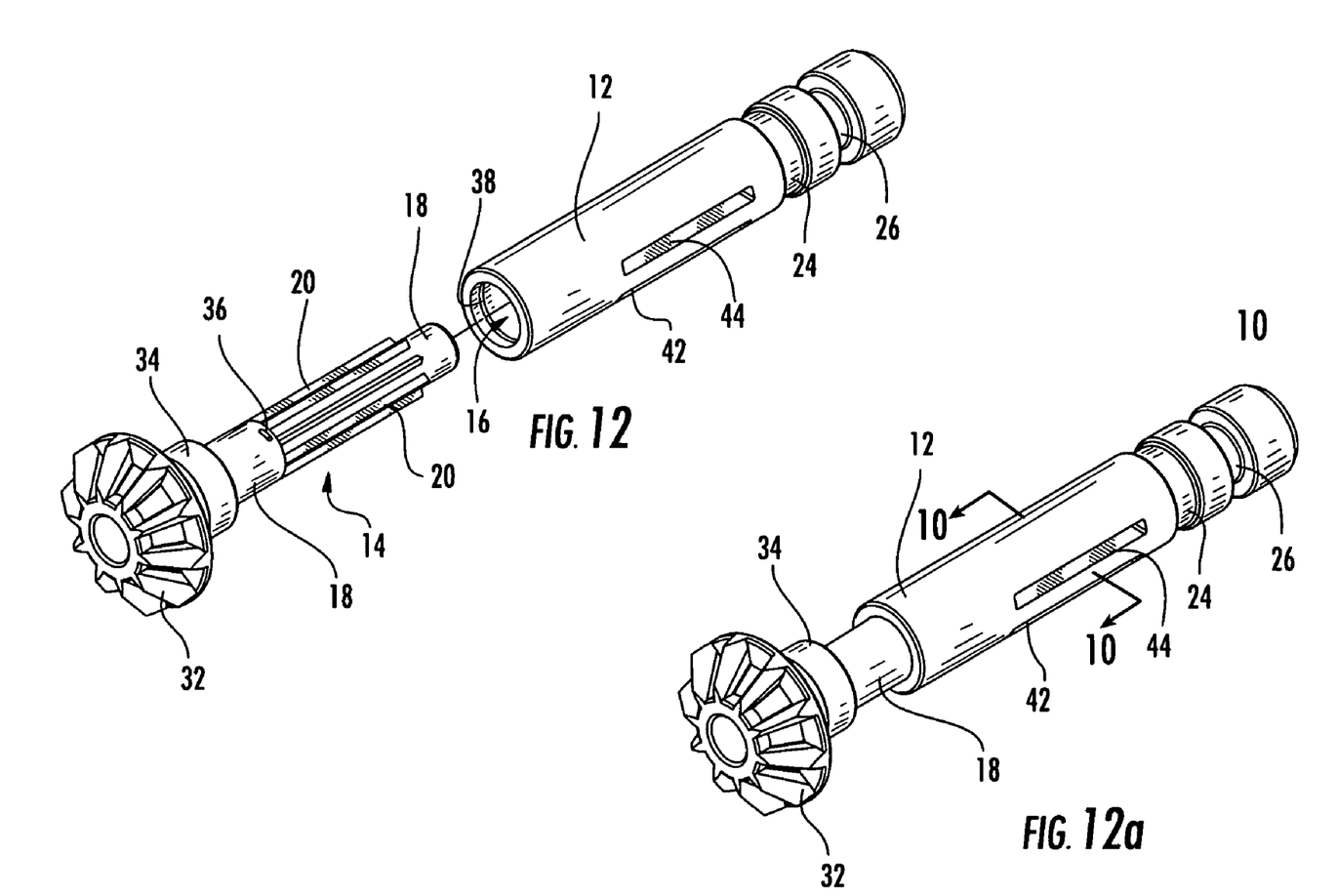
FIG. 12 is an exploded perspective view of another embodiment of an input shaft in accordance with the present invention.
FIG. 12a is a perspective view of the input shaft of FIG. 12, shown in an extended position.

A number of different methods can be used to adjust the input shaft 10 of the present invention to different lengths. As shown in FIG. 11, one way in which the input shaft 10 of the present invention can adjust to different lengths is through the use of a series of snap fit connections. In FIG. 11, the body 18 of the bottom portion 14 of the input shaft 10 includes an annular notch 36 that can mate or snap-fit into a series of annular rings 38 formed within the interior 16 of the top portion 12 of the input shaft 10. Any number of annular notches 36 could be used, including a single annular notch 36. As well, the annular ring 38 and annular notch 36 could be of a variety of shapes, and could be non-annular with respect to the body 18 and interior 16. For instance, simple notches and grooves could be used, as well as a rectangular notch 36 as shown in FIG. 1 and previously described.

Figure 13:
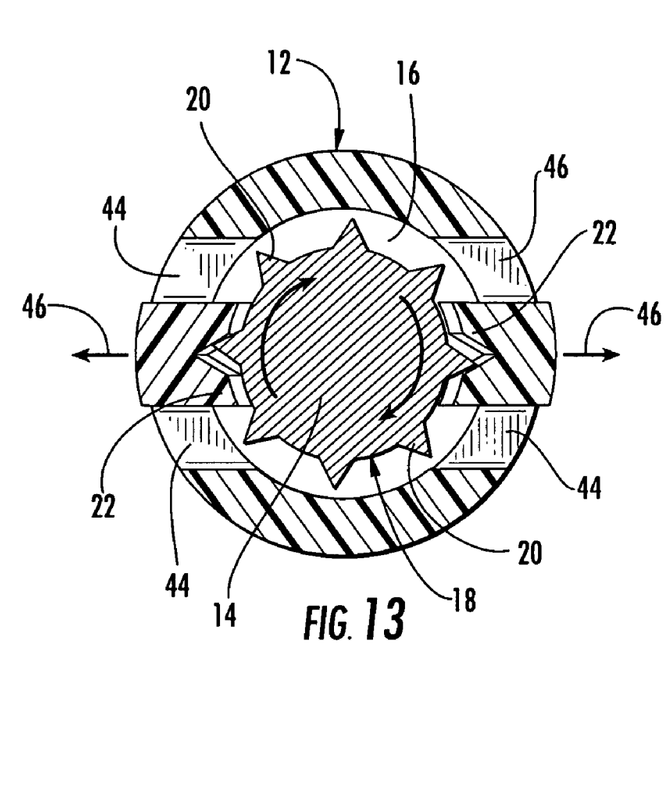
FIG. 13 is a cross sectional view of the input shaft of FIG. 12, taken along plane 13-13 in FIG. 14, illustrating a clutching feature of the present invention.
Figure 14:
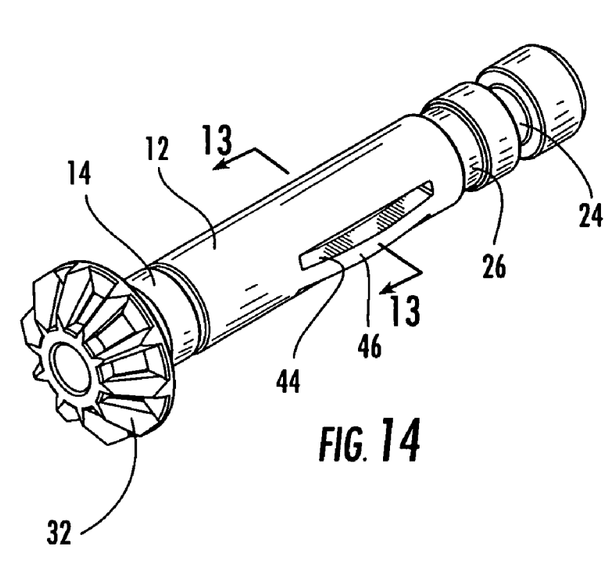
FIG. 14 is a perspective view of the input shaft of FIG. 12, shown in a non-extended position and illustrating a clutching feature of the present invention.

Another embodiment of the input shaft 10 of the present invention is shown in FIGS. 10 and 12-14. The embodiment shown in FIGS. 10 and 12-14 includes a clutching feature. In particular, the top portion 12 of the input shaft 10 has a plurality of clutching slots 44. Any number of slots 44 could be used, including a single clutching slot 44. The clutching slots 44 allow the top portion 12 of the input shaft 10 to bend or bow outward in response to excessive torque, as shown in FIGS. 13 and 14 at reference number 46. The clutching feature thus prevents damage to the rest of the input shaft 10, adjuster or lamp assembly by creating a bowing point and disengaging the splines 20, 22 (see FIG. 13) from one another to prevent further application of excessive torque. As previously described, the input shaft 10 of the present invention could be used in applications requiring multiple lengths and the clutching feature, multiple lengths alone, or the clutching feature alone. If the clutching feature is the only desired feature for an application, the input shaft 10 could include the multiple length feature as well, but would only need a single length secured position.

In operation, the input shaft 10 of the present invention is installed in an adjuster 40 such that the gear 32 meshes with an adjustment gear (not shown) or other adjusting mechanism (not shown) to effect movement of the output shaft 42 of the adjuster 40. The input shaft 10 can be adjusted to the desired length for the particular application either before or after installation into the adjuster 40. The input shaft 10 can also be fastened to a mounting bracket 28 using groove 24 or using other suitable means. The input shaft 10, once installed in the adjuster 40, can then be used to effect movement of the output shaft 28. As shown in FIG. 11, the top portion 12 of the input shaft 10 has a head 70 including a recess 72 formed to receive a driver (not shown). The recess 72 could be in a number of shapes to accommodate a wide variety of drivers, such as a screwdriver, Phillips® head driver or TORX® head driver. An operator would thus use a driver (not shown) to turn the input shaft 10. The exterior splines 20 on the body 18 of the bottom portion 14 of the input shaft 10 mate with the interior splines 22 on the interior 16 of the top portion 12 of the input shaft 10, as shown best in FIGS. 9 and 10. Thus, the bottom portion 14, including gear 32, rotates in concert with the top portion 12 as the operator turns the top portion 12 with a driver. The rotation of gear 32 causes rotation of an adjustment gear (not shown) or other portion of an adjusting mechanism (not shown) in the adjuster 40, which in turn effects movement of the output shaft 42. If the input shaft 10 includes clutching slots 44 as previously described, the clutching slots 44 will bow outward, as shown best in FIGS. 13 and 14, in response to excessive torque applied to the head 70 of the input shaft 10 and thus prevent damage to the adjuster 40 or lamp assembly 50.

Each portion of the input shaft 10 of the present invention can be formed from a number of different materials to meet the particular needs of the adjuster and vehicle. It has been found cost effective and otherwise beneficial to form the top portion 12 and bottom portion 14 out of a plastic material. Alternatively, the bottom portion 14 can be formed from zinc or other metal material, and the top portion 12 can be formed from a plastic material. The use of a plastic material for the top portion 12 is a cost effective alternative to fixed prior art input shafts formed from zinc, especially when longer input shafts are required. However, as previously mentioned, the portions of the input shaft of the present invention can be formed from any material that meets the needs of the particular application.

The input shaft described herein could be used in connection with a wide variety of headlamp adjuster types. For example, it could be used in connection with the adjuster types shown in the following U.S. patents: U.S. Pat. No. 6,257,747 to Burton; U.S. Pat. No. 5,023,759 to Eckenrode; U.S. Pat. No. 5,034,870 to Weber; U.S. Pat. No. 5,077,642 to Lisak; U.S. Pat. No. 5,163,746 to Lisak; U.S. Pat. No. 5,186,531 to Ryder et al.; U.S. Pat. No. 5,214,971 to Burton et al.; U.S. Pat. No. 5,355,287 to Denley; and many others. Further, the input shaft and adjuster of the present invention may have other applications aside from use in connection with vehicle lamp assemblies. Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims.

What is claimed is:

1. An input shaft for a lamp adjuster, the input shaft comprising:
   a top input shaft portion having an interior, the interior including at least one mating feature;
   a bottom input shaft portion having a first end, a second end and a body between the first end and the second end, the first end and the body disposed at least partially within the interior of the top input shaft portion and the body including at least one corresponding mating feature;
   a gear functionally connected to the second end of the bottom input shaft portion; and
   wherein the mating feature of the interior of the top input shaft portion and the corresponding mating feature of the body of the bottom input shaft portion matingly engage such that rotation of the top input shaft portion causes rotation of the bottom input shaft portion.

2. The input shaft of claim 1, further comprising at least one clutching slot formed in the top input shaft portion such that when an excessive rotational force is applied to the top input shaft portion, the top input shaft portion slips with respect to the bottom input shaft portion.

3. The input shaft of claim 1, wherein the top input shaft portion is longitudinally moveable relative to the bottom input shaft portion such that the input shaft adjusts to a plurality of different lengths.

4. The input shaft of claim 1, wherein the interior of the top input shaft portion includes at least one annular ring that receives a notch on the body of the bottom input shaft portion.

5. The input shaft of claim 1, wherein the top input shaft portion includes a head with a recess for receiving a driver.

6. The input shaft of claim 1, further comprising a locator accessory fastened to the top input shaft portion.

7. An input shaft for a lamp adjuster, the input shaft comprising:
   a top input shaft portion having an interior;
   a bottom input shaft portion having a body, the body disposed at least partially within the interior of the top input shaft portion and in mating engagement with the top input shaft portion such that rotation of the top input shaft portion causes rotation of the bottom input shaft portion; and
   at least one clutching slot formed in the top input shaft portion such that when an excessive rotational force is applied to the top input shaft portion, the top input shaft portion slips with respect to the bottom input shaft portion.

8. The input shaft of claim 7, wherein the top input shaft portion is longitudinally moveable relative to the bottom input shaft portion such that the input shaft adjusts to a plurality of different lengths.

9. The input shaft of claim 8, wherein the top input shaft portion and bottom input shaft portion snap together at a plurality of locations along the length of the input shaft.

10. The adjuster of claim 7, wherein the bottom input shaft portion includes an integrally formed gear.

11. An input shaft for a lamp adjuster, the input shaft comprising
    a top input shaft portion having an interior;
    a bottom input shaft portion having a body, the body disposed at least partially within the interior of the top input shaft portion and in mating engagement with the top input shaft portion such that rotation of the top input shaft portion causes rotation of the bottom input shaft portion; and
    wherein the top input shaft portion is longitudinally moveable relative to the bottom input shaft portion such that the input shaft adjusts to a plurality of different lengths.

12. The input shaft of claim 11, further comprising at least one clutching slot formed in the top input shaft portion such that when an excessive rotational force is applied to the top input shaft portion, the top input shaft portion slips with respect to the bottom input shaft portion.

13. The input shaft of claim 11, wherein the bottom input shaft portion supports a gear.

14. An input shaft for a lamp adjuster, the input shaft comprising:
    a top input shaft portion having an interior;
    a bottom input shaft portion having a body, the body disposed at least partially within the interior of the top input shaft portion and supporting a gear and in mating engagement with the top input shaft portion such that rotation of the top input shaft portion causes rotation of the bottom input shaft portion;
    at least one clutching slot formed in the top input shaft portion; and
    wherein the top input shaft portion is longitudinally moveable relative to the bottom input shaft portion such that the input shaft adjusts to a plurality of different lengths.

15. An adjuster for a lamp assembly, the adjuster comprising:
    a housing;
    an output shaft disposed at least partially within the housing and engaging a portion of the lamp assembly;
    an input shaft disposed at least partially within the housing, the input shaft including a top input shaft portion having an interior and a bottom input shaft portion having a body and supporting a gear, wherein the interior of the top input shaft portion and the body of the bottom input shaft portion matingly engage such that rotation of the top input shaft portion causes rotation of the bottom input shaft portion, wherein the top input shaft portion includes at least one clutching slot, and wherein the top input shaft portion is longitudinally moveable relative to the bottom input shaft portion such that the input shaft is adjustable to a plurality of different lengths; and
    wherein application of a normal rotational force to the input shaft results in movement of the output shaft to adjust the lamp assembly.

16. The adjuster of claim 15, further comprising an adjusting mechanism that translates movement of the input shaft to movement of the output shaft.

17. The adjuster of claim 15, wherein application of an excessive rotational force to the input shaft does not result in movement of the output shaft.

* * * * *